US012766976B2

(12) United States Patent
Kondo

(10) Patent No.: US 12,766,976 B2
(45) Date of Patent: Oct. 20, 2026

(54) DRIVING FORCE CONTROL DEVICE FOR RIGHT AND LEFT WHEEL INDEPENDENT DRIVE TYPE VEHICLE

(71) Applicant: TOYOTA JIDOSHA KABUSHIKI KAISHA, Toyota (JP)

(72) Inventor: Takahiro Kondo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 18/960,192

(22) Filed: Nov. 26, 2024

(65) Prior Publication Data

US 2025/0196658 A1 Jun. 19, 2025

(30) Foreign Application Priority Data

Dec. 19, 2023 (JP) ................................ 2023-213893

(51) Int. Cl.
*B60L 15/20* (2006.01)

(52) U.S. Cl.
CPC ........... *B60L 15/20* (2013.01); *B60L 2250/22* (2013.01)

(58) Field of Classification Search
CPC ... B60L 15/20; B60L 2250/22; B60L 2220/42
See application file for complete search history.

(56) References Cited

U.S. PATENT DOCUMENTS

| | | | |
|---|---|---|---|
| 6,549,840 B1 | 4/2003 | Mikami | |
| 2014/0316637 A1 | 10/2014 | Rhode et al. | |
| 2023/0286493 A1 | 9/2023 | Tomatsu | |

FOREIGN PATENT DOCUMENTS

| | | | | | |
|---|---|---|---|---|---|
| CN | 111267639 A | * | 6/2020 | .............. B60L 15/20 |
| CN | 116278790 B | * | 5/2025 | .............. B60L 15/32 |
| JP | 2001-112114 A | | 4/2001 | |
| JP | 2008265545 A | * | 11/2008 | ............. B60R 16/02 |
| JP | 2013-216129 A | | 10/2013 | |
| JP | 2016150605 A | * | 8/2016 | |
| JP | 2018020660 A | * | 2/2018 | |
| JP | 2023-133777 A | | 9/2023 | |
| WO | WO-2021220693 A1 | * | 11/2021 | ................ B60L 9/18 |

OTHER PUBLICATIONS

JP-2018020660-A machine translation (Year: 2018).*
WO-2021220693-A1 machine translation (Year: 2021).*
JP-2008265545-A machine translation (Year: 2008).*
CN-111267639-A machine translation (Year: 2020).*
JP-2016150605-A 2016 machine learning (Year: 2016).*
CN-116278790-B machine learning (Year: 2025).*

* cited by examiner

*Primary Examiner* — Anne Marie Antonucci
*Assistant Examiner* — Jingli Wang
(74) *Attorney, Agent, or Firm* — SoraIP, Inc.

(57) ABSTRACT

A left electric motor for driving a left wheel and a right electric motor for driving a right wheel paired with the left wheel are provided, and a center of gravity position of the right and left wheel independent drive type vehicle is estimated, and a correction torque for canceling a yaw moment generated in accordance with a difference between the estimated center of gravity position of the right and left wheel independent drive type vehicle and a predetermined center of gravity position determined in advance is added to an output torque of the left electric motor and the right electric motor.

10 Claims, 5 Drawing Sheets

DRIVING FORCE CONTROL DEVICE FOR RIGHT AND LEFT WHEEL INDEPENDENT DRIVE TYPE VEHICLE

CROSS-REFERENCE TO RELATED APPLICATION

This application claims priority to Japanese Patent Application No. 2023-213893 filed on Dec. 19, 2023, incorporated herein by reference in its entirety.

BACKGROUND

1. Technical Field

The present disclosure relates to a driving force control device for a vehicle configured to drive right and left wheels independently of each other.

2. Description of Related Art

Japanese Unexamined Patent Application Publication No. 2001-112114 (JP 2001-112114 A) describes a control device for a four-wheel drive vehicle that includes a front motor that serves as a drive force source for a pair of front wheels and a rear motor that serves as a drive force source for a pair of rear wheels. When the operation of the rear motor is limited according to the temperature of the rear motor or the temperature of a power storage device, the control device sets the output torque of the rear motor to limit torque determined based on the temperature of the rear motor. Then, torque corresponding to the limit torque of the rear motor is subtracted from the drive torque required for the vehicle. Further, the subtracted torque is set as the output torque of the front motor. The front motor and the front wheels are coupled via a differential gear mechanism, and similarly, the rear motor and the rear wheels are coupled via a differential gear mechanism.

In addition, WO 2021/220693 describes a control device for a vehicle that includes a pair of electric motors that drives right and left wheels and a differential mechanism that applies a torque difference to the right and left wheels. This control device is intended to improve the turning responsiveness of the vehicle body to steering. The control device is configured to output, from the electric motors, compensation torque for canceling a turning inhibition yaw moment generated by a difference between first inertial torque in a power transfer path from the electric motor to the right wheel and second inertial torque in a power transfer path from the electric motor to the left wheel.

SUMMARY

In the four-wheel drive vehicle described in JP 2001-112114 A, the motors and the drive wheels are coupled via the differential mechanisms. When the position of the center of gravity of the vehicle as a whole changes according to the presence or absence of an occupant or a load, or the weight thereof, or the position thereof, the torque is split such that larger torque is transferred to the wheel whose ground contact load increases. On the other hand, the wheel to which such larger torque is transferred is closer to the center of gravity of the vehicle than the wheel on the other side. That is, even if the distance between the position of the center of gravity and the drive wheels changes with the change of the position of the center of gravity, the driving force mechanically changes according to the change of the distance. Thus, the difference between the yaw moment based on the driving force of the right drive wheel and the yaw moment based on the driving force of the left drive wheel is suppressed, and deterioration of the traveling stability and the operability of the vehicle can be suppressed.

In contrast, in the case of a vehicle in which the right and left wheels are independently provided with motors, the same torque is output from the respective motors, and the same torque is transferred to the right and left drive wheels. Thus, when the position of the center of gravity of the vehicle as a whole changes, a change in the distance between the position of the center of gravity and the drive wheels due to the change in the position of the center of gravity appears as a difference between the yaw moment based on the driving force of the right drive wheel and the yaw moment based on the driving force of the left drive wheel. As a result, a yaw moment is generated so as to deflect the vehicle, and there is a possibility that the traveling stability and the operability of the vehicle deteriorate.

Further, according to the control device described in WO 2021/220693, compensation torque for canceling a turning inhibition yaw moment is obtained based on predetermined specifications of a power transfer path from an electric motor to a drive wheel, motors, tires, etc. However, the control device described in WO 2021/220693 does not consider that the position of the center of gravity of the entire vehicle changes according to an occupant or a load. Therefore, even if the compensating torque for canceling the turning inhibition yaw moment is output, a yaw moment is generated along with the change in the position of the center of gravity, and there is a possibility that the traveling stability and the operability of the vehicle deteriorate.

The present disclosure has been made in view of the above technical issue, and an object of the present disclosure is to provide a driving force control device for a right and left wheel independent drive type vehicle capable of suppressing the generation of a yaw moment due to a change in the position of the center of gravity of the vehicle.

In order to achieve the above object, an aspect of the present disclosure provides a driving force control device for a right and left wheel independent drive type vehicle, including: a right electric motor that drives a right wheel, and a left electric motor that drives a left wheel paired with the right wheel; and

- a controller that controls the right electric motor and the left electric motor, in which the controller includes:
- a center-of-gravity estimation unit that estimates a center-of-gravity position of the right and left wheel independent drive type vehicle; and
- a torque correction unit that adds correction torque for canceling a yaw moment to output torque of the right electric motor and the left electric motor, the yaw moment being generated according to a difference between the estimated center-of-gravity position of the right and left wheel independent drive type vehicle estimated by the center-of-gravity estimation unit and a predetermined center-of-gravity position determined in advance.

In an aspect of the present disclosure, the driving force control device may further include a plurality of seats on which an occupant is to be seated, and a plurality of seating sensors provided for each of the seats to detect that the occupant is seated, and the center-of-gravity estimation unit may estimate the center-of-gravity position of the right and left wheel independent drive type vehicle based on a position of the seating sensor that detects that the occupant is seated.

In an aspect of the present disclosure, the driving force control device may further include a plurality of suspensions that reciprocates in an up-down direction of the right and left wheel independent drive type vehicle to suppress vibration of each of the wheels in the up-down direction, and a stroke sensor provided for each of the suspensions to detect a displacement amount of the suspension, and the center-of-gravity estimation unit may estimate the center-of-gravity position of the right and left wheel independent drive type vehicle based on the displacement amount of the suspensions detected by the stroke sensor.

In an aspect of the present disclosure, the torque correction unit may increase torque of one of the right electric motor and the left electric motor that is coupled to one of the right wheel and the left wheel on a side closer to the estimated center-of-gravity position estimated by the center-of-gravity estimation unit than the predetermined center-of-gravity position, and reduce torque of the other of the right electric motor and the left electric motor.

In an aspect of the present disclosure, the center-of-gravity estimation unit may estimate the center-of-gravity position of the right and left wheel independent drive type vehicle when the right and left wheel independent drive type vehicle is stopped or during straight travel in which a steering angle of the right and left wheel independent drive type vehicle is within a predetermined angle range.

According to the present disclosure, the center-of-gravity position of the right and left wheel independent drive type vehicle is estimated, and the correction torque for canceling the yaw moment is added to the output torque of the right electric motor and the left electric motor, the yaw moment being generated according to the difference between the estimated center-of-gravity position and the predetermined center-of-gravity position determined in advance. Therefore, even if the position of the center of gravity of the right and left wheel independent drive type vehicle as a whole changes based on the position or the weight of an occupant that rides in the right and left wheel independent drive type vehicle, or the loading position or the weight of a load, the yaw moment due to the change in the position of the center of gravity can be canceled, and the generation of an unintended yaw moment can be suppressed. As a result, it is possible to improve the straight traveling property, the turning traveling property, or the stability during braking. In other words, deterioration in the operability during traveling can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will now be described with reference to the accompanying drawings. Note that the embodiments described below are merely examples of the implementation of the present disclosure, and do not limit the present disclosure.

A vehicle according to the present disclosure is an electric motor (motor or motor generator) as a power source corresponding to a pair of left front wheels and right front wheels, or a pair of left rear wheels and right rear wheels. Hereinafter, it will be described as a motor. The present disclosure relates to a vehicle capable of independently driving a left wheel and a right wheel. The vehicle may be a total four-wheeled vehicle of a front two-wheeled and a rear two-wheeled vehicle. In this case, the vehicle may be a vehicle in which a driving device is provided on each of the front two wheels and the rear two wheels, and each of the front two wheels and the rear two wheels can be driven independently of each other. The motor may be provided on each of two wheels of either the front two wheels or the rear two wheels, and the other two wheels may be a vehicle connected to a single electric motor via a differential gear.

Figure 1:
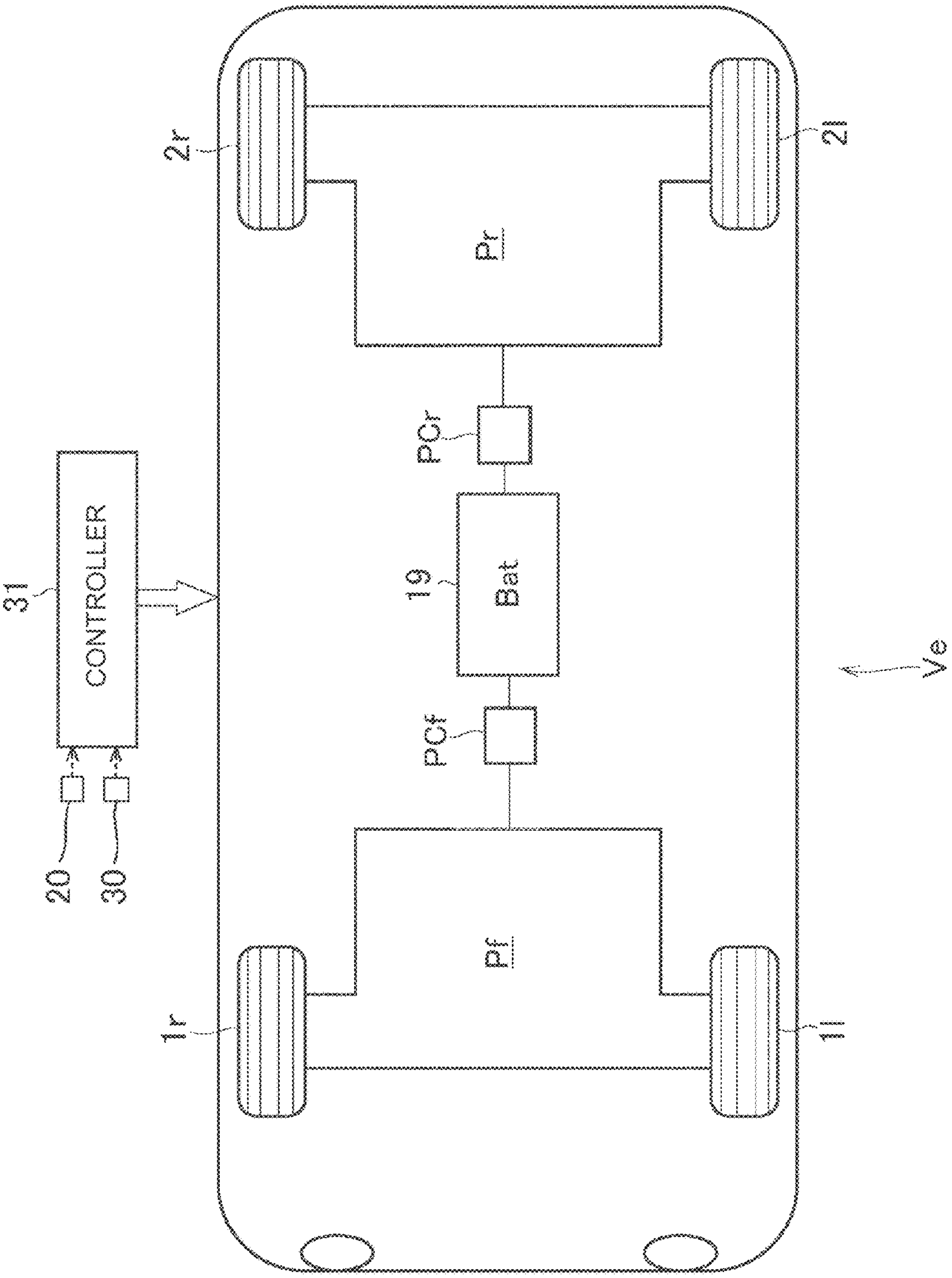
FIG. 1 is a block diagram schematically showing a drive system of a right and left wheel independent drive type vehicle according to an embodiment of the present disclosure.

FIG. 1 schematically illustrates an example of a four-wheel independent drive vehicle configured to drive all four wheels independently of each other. Electrified vehicle (hereinafter, simply referred to as vehicles) Ve shown here includes a pair of right and left front wheels 1*r*, 1*l* and a pair of left and right rear wheels 2*r*, 2*l*, and a drive unit Pf, Pr as a driving force source is provided corresponding to each of the front wheels 1*r*, 1*l* and the rear wheels 2*r*, 2*l*. Each of the drive units Pf, Pr is mainly constituted by a motor and a gear reduction mechanism (transmission mechanism).

Figure 2:
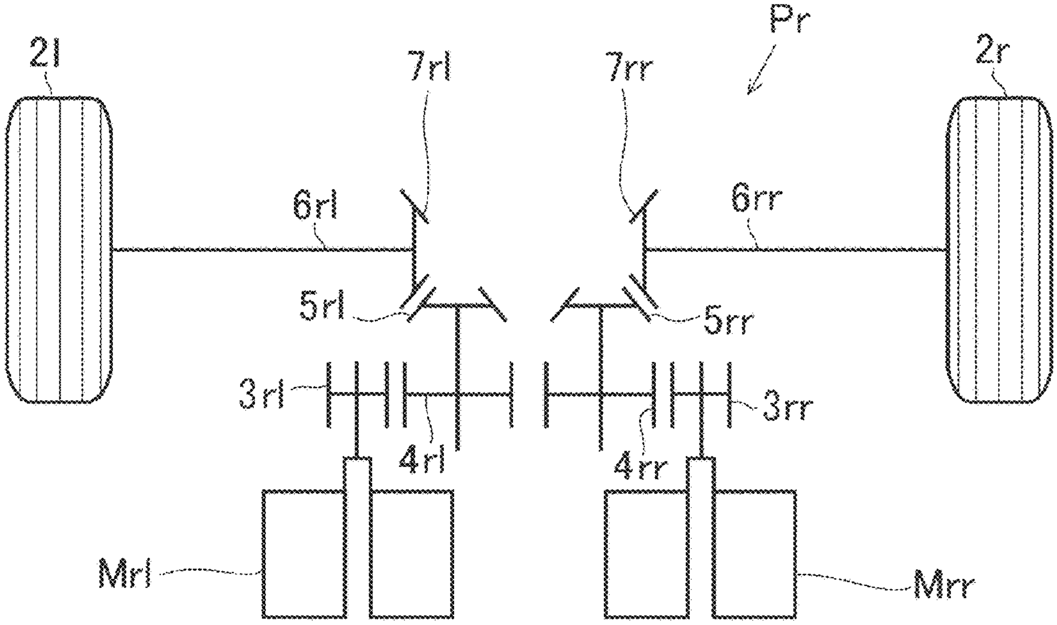
FIG. 2 is a skeleton diagram illustrating an example of a drive unit on a rear wheel side.

FIG. 2 is a skeleton diagram illustrating an exemplary drive unit Pr on the rear wheel 2*r*, 2*l*. This drive unit Pr is constituted by a pair of drive systems that control the right and left rear wheel 2*r*, 2*l* independently of each other, and these drive systems are symmetrical in configuration, and therefore will be described collectively without being limited to "right" or "left". In the following description, when the suffix of the reference numeral is one character, "f" indicates for the front wheel, "l" indicates for the left wheel, and "r" indicates for the right wheel or the rear wheel. In the case of two characters, "f" of the first character indicates for the front wheels, "r" for the rear wheels, "r" of the second character indicates for the right wheels, and "l" indicates for the left wheels.

In the drive unit Pr of the rear wheel 2*r*, 2*l*, a motor Mrr, Mrl is mounted with its rotational center axial line facing the front-rear direction of the vehicle Ve. A drive gear 3*rr*, 3*rl* is attached to the rotor shaft, and the drive gear 3*rr*, 3*rl* meshes with the counter driven gear 4*rr*, 4*rl*. The counter driven gear 4*rr*, 4*rl* is larger in diameter than the drive gear 3*rr*, 3*rl*, and therefore these gear pairs constitute a reduction gear. A counter drive gear 5*rr*, 5*rl* which is a bevel gear is provided so as to rotate integrally on the same axis as the counter driven gear 4*rr*, 4*rl*. The counter drive gear 5*rr*, 5*rl* meshes with a driven gear 7*rr*, 7*rl* which is a bevel gear integral with a drive shaft 6*rr*, 6*rl* connected to the rear wheel 2*r*, 2*l*. By making the driven gear 7*rr*, 7*rl* larger in diameter than the counter drive gear 5*rr*, 5*rl*, the gear pair can be a reduction gear.

Figure 3:
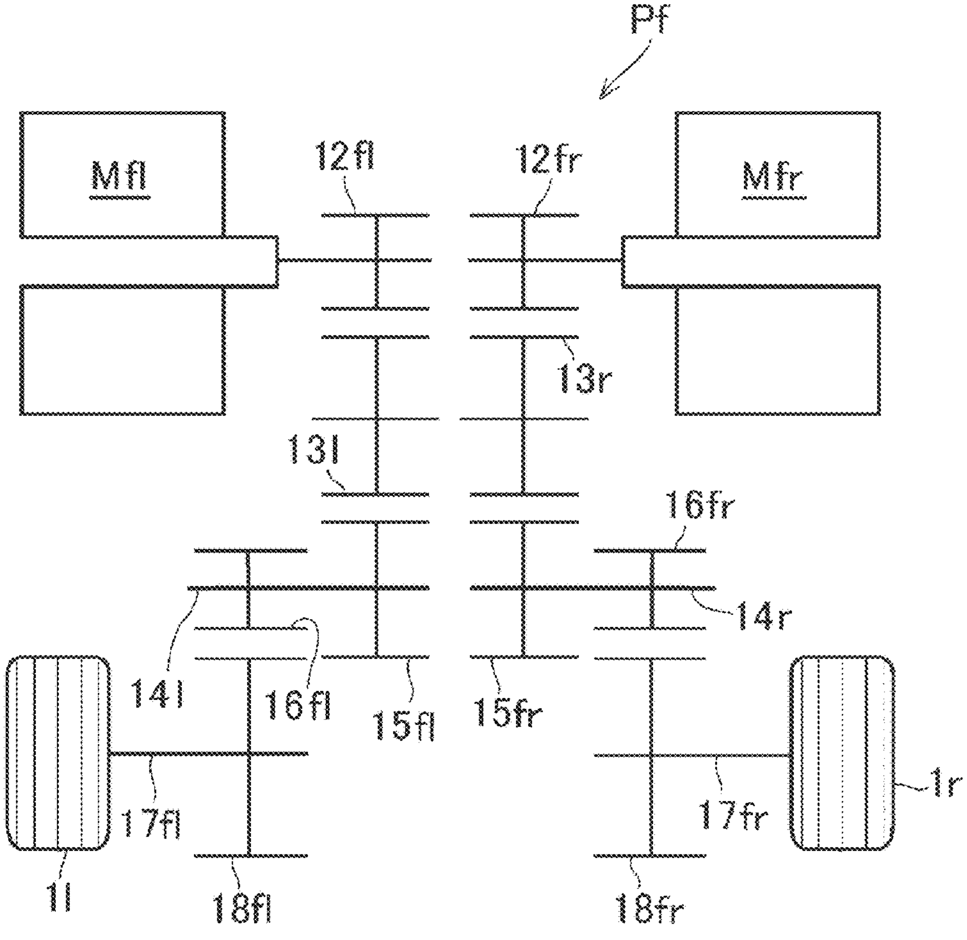
FIG. 3 is a skeleton diagram illustrating an example of a drive unit on a front wheel side.

FIG. 3 is a skeleton diagram illustrating an exemplary drive unit Pf on the front wheel 1*r*, 1*l*. Since the drive unit Pf has a bilaterally symmetrical configuration, it will be described collectively without particular reference to "right" and "left". A motor Mfr, Mfl is mounted with its rotational center-axis oriented in the lateral direction of the vehicle Ve. A drive gear 12*fr*, 12*fl* is attached to the rotor shaft, and the drive gear 12*fr*, 12*fl* meshes with the idle gear 13*r*, 13*l*. A counter shaft 14*r*, 14*l* is provided parallel to the rotational center axis of the idle gear 13*r*, 13*l*. An idle gear 13*r*, 13*l* meshes with a counter driven gear 15*fr*, 15*fl* attached to the counter shaft 14*r*, 14*l*.

Since the counter driven gear 15*fr*, 15*fl* has a larger diameter than the drive gear 12*fr*, 12*fl* attached to the motor Mfr, Mrl, the gear pair constitutes a reduction gear. A counter drive gear 16*fr*, 16*fl* is attached to the counter shaft 14*r*, 14*l*. The counter drive gear 16*fr*, 16*fl* meshes with a driven gear 18*fr*, 18*fl* integral with a drive shaft 17*fr*, 17*fl* coupled to the front wheel 1*r*, 1*l*. Since the driven gear 18*fr*, 18*fl* has a larger diameter than that of the counter drive gear 16*fr*, 16*fl*, the gear pair constitutes a reduction gear.

Note that the wheel 1*l*, 2*l* corresponds to the "left wheel" in the embodiment of the present disclosure, and the wheel 1*r*, 2*r* corresponds to the "right wheel" in the embodiment of the present disclosure. The motor Mfl, Mrl corresponds to the "left electric motor" in the embodiment of the present disclosure, and the motor Mfr, Mrr corresponds to the "right electric motor" in the embodiment of the present disclosure.

The vehicle Ve shown in FIG. 1 is provided with a power storage device (Bat) 19 that transmits and receives electric power to and from the motor Mfr, Mfl, Mrr, Mrl. The power storage device 19 mainly includes a secondary battery such as a lithium-ion battery or an all-solid-state battery. That is, the power storage device 19 is constituted by a DC power supply. The motor Mfr, Mfl, Mrr, Mrl are, for example, permanent magnet-type synchronous motors. These motor Mfr, Mfl, Mrr, Mrl are connected to the power storage device 19 via a power controller PCfr, PCfl, PCrr, PCrl mainly composed of inverters. The power controller PCfr, PCfl, PCrr, PCrl converts the DC voltage of the power storage device 19 into an AC voltage, applies the AC voltage to the motor Mfr, Mfl, Mrr, Mrl, and converts the AC voltage generated by the motor Mfr, Mfl, Mrr, Mrl into a DC voltage to charge the power storage device 19. Therefore, the motor Mfr, Mfl, Mrr, Mrl individually control the outputting torque and the braking torque at the time of energy regeneration independently of each other. Note that the power controller PCfr, PCfl, PCrr, PCrl may be configured as a single unit as a whole, as long as the functions thereof are independent of each other.

The vehicle Ve configured as described above can control the output torques of the motor Mfr, Mfl, Mrr, Mrl independently of each other. Therefore, for example, it is possible to switch between the two-wheel drive traveling mode in which the motor Mrr, Mrl is controlled as the driving force source and the energization of the motor Mfr, Mfl is stopped, and the four-wheel drive traveling mode in which the motor Mfr, Mfl, Mrr, Mrl are controlled as the driving force source. In addition, in order to improve the turning performance, when the two-wheel drive traveling mode or the four-wheel drive traveling mode is set, the right motor Mfr, Mrr and the left motor Mfl, Mrl can travel with different torques.

Figure 4:
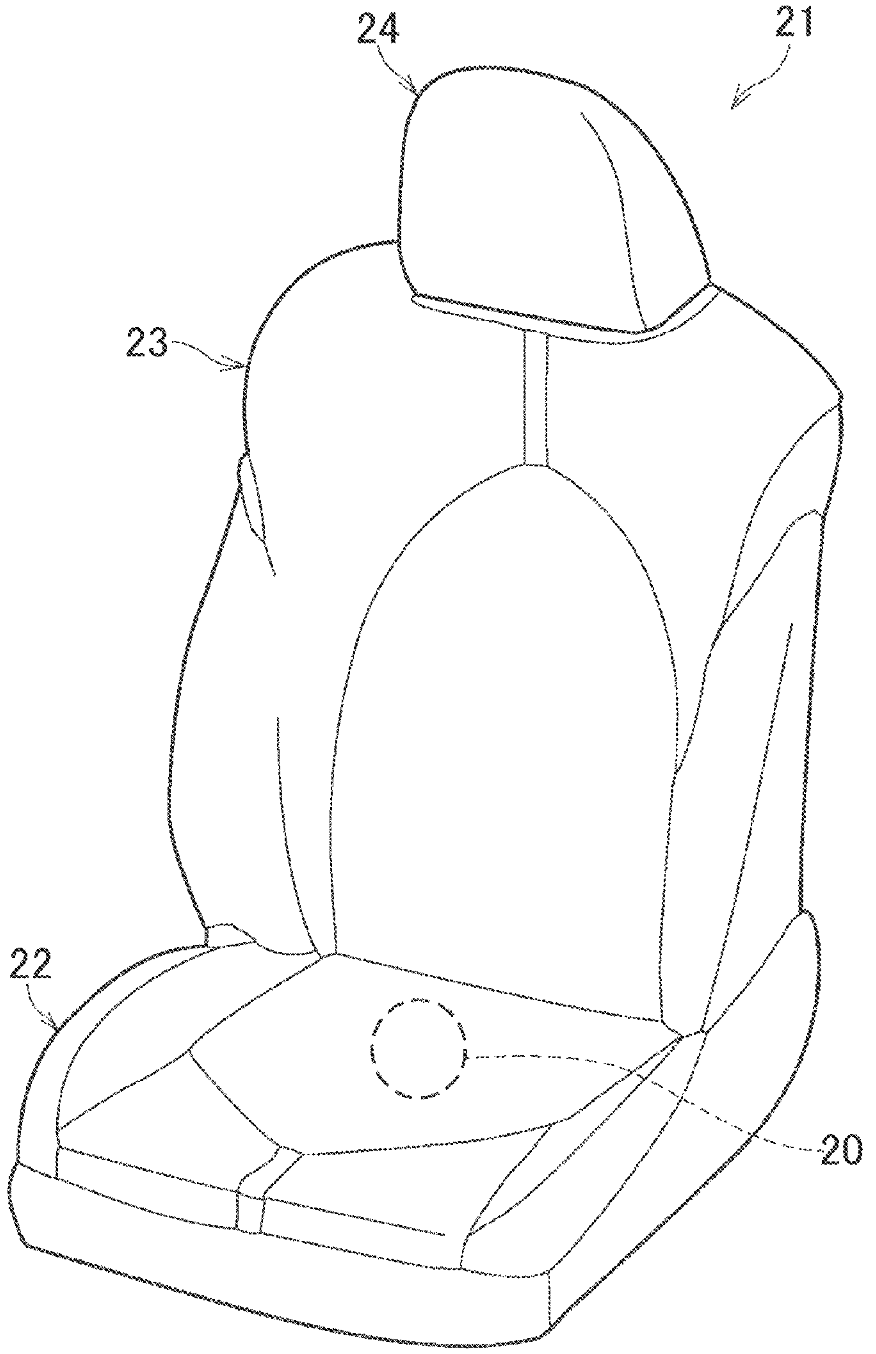
FIG. 4 is a perspective view illustrating an example of a sheet.

Further, in the above-described vehicle Ve, in order to determine the position of the center of gravity of the entire vehicle Ve, a pressure sensor is provided for each seat to detect whether or not the occupant is seated on any of the seats, and to detect the weight of the occupant seated on the seat or the load placed on the seat. FIG. 4 shows an example of a seat 21 with a pressure sensor 20. The seat 21 shown in FIG. 4 includes a seat cushion 22 on which an occupant is seated, a seat back 23 attached from a rear end portion of the seat cushion 22 toward an upper side in a vertical direction, and a headrest 24 attached to an upper end of the seat back 23, and a pressure sensor 20 is provided in a central portion of the seat cushion 22. A plurality of pressure sensors 20 may be provided in one seat cushion 22, and may be configured to detect the weight of an occupant or a load seated on the seat cushion 22 based on the total value. The configuration of the seat 21 and the position at which the pressure sensor 20 is provided are not limited to the example illustrated in FIG. 4. In addition, a seating sensor that only detects an occupant seated on the seat 21 or a load placed on the seat 21 and does not detect the weight thereof may be provided in place of the pressure sensor 20.

Figure 5:
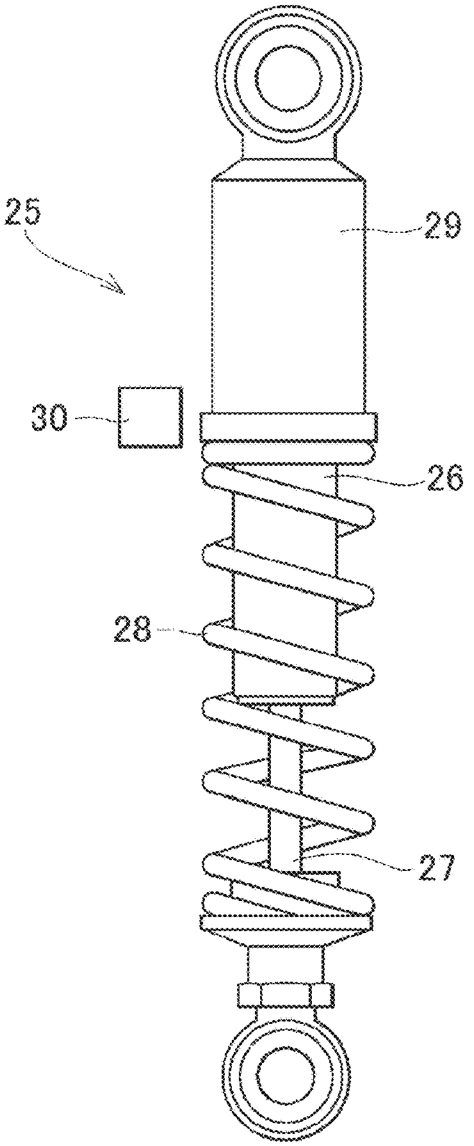
FIG. 5 is a front view illustrating an example of a suspension.

Further, in the above-described vehicle Ve, suspensions 25 for absorbing the vertical loads of the wheels are attached to the respective drive shaft 6*rr*, 6*rl*, 17*fr*, 17*fl*. FIG. 5 shows an example of the suspension 25, and the suspension 25 can be configured in the same manner as a suspension provided in a conventional vehicle. Specifically, an upper rod 26 whose upper end is connected to the vehicle body, a lower rod 27 which is attached to the upper rod 26 so as to be reciprocally movable in the axial direction and whose lower end is connected to the drive shaft 6*rr*, 6*rl*, 17*fr*, 17*fl*, a coil spring 28 which is sandwiched between the upper rod 26 and the lower rod 27 so as to press the lower rod 27 downward, and a shock absorber 29 which damps vibrations by the flow resistance of the incompressible fluid when the incompressible fluid is accommodated therein and the lower rod 27 moves up and down with respect to the upper rod 26. Further, a stroke sensor 30 for detecting a stroke amount (displacement amount) of the suspension 25, that is, an amount of relative movement of the lower rod 27 with respect to the upper rod 26 is provided.

In addition, the vehicle Ve is provided with controllers (electronic control units) 31 for controlling the motor Mfr, Mfl, Mrr, Mrl. The controller 31 mainly includes a microcomputer. The controller 31 is configured to perform an operation according to a predetermined program or referring to a predetermined map using the input data and data stored in advance, and to output the result of the operation to the motor Mfr, Mfl, Mrr, Mrl as a control command signal.

Figure 6:
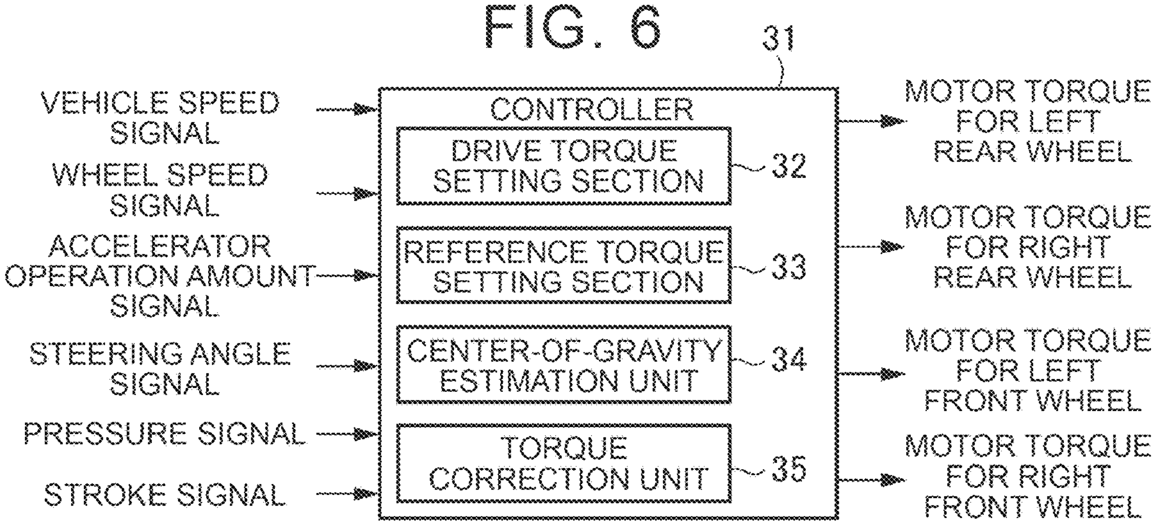
FIG. 6 shows the input and output signals and the functional configuration of the controllers.

An example of an input signal and an output signal for performing such control is shown in FIG. 6. Examples of the input signal include a vehicle speed signal of a vehicle speed sensor (not shown) that detects a vehicle speed, a wheel speed signal of a wheel speed sensor (not shown) that detects a rotation speed of each wheel, and an accelerator operation amount signal of an accelerator operation amount sensor that detects an operation amount of an accelerator device (not shown). Examples of the input signal include a steering angle signal of a steering angle sensor (not shown) that detects a steering angle of the vehicle Ve, a pressure signal of the pressure sensor 20 that detects the presence or absence of an occupant or the weight of the occupant, and a stroke signal of the stroke sensor 30 that detects a stroke amount of the suspension 25. Examples of the command signals to be outputted include torque of the motor Mrl for the left rear wheel 21, torque of the motor Mrr for the right rear wheel 2*r*, torque of the motor Mfl for the left front wheel 1*l*, torque of the motor Mfr for the right front wheel 1*r*, and the like.

Further, as shown in FIG. 6, the controller 31 includes a drive torque setting unit 32 for determining the drive torque required for the vehicle, a reference torque setting unit 33 for setting the reference torque of the motor Mfr, Mfl, Mrr, Mrl, a center-of-gravity estimation unit 34 for estimating the center-of-gravity position of the vehicle Ve, and a torque correction unit 35 for correcting the reference torque based on the center-of-gravity position (estimated center-of-gravity position) estimated by the center-of-gravity estimation unit 34.

Like the conventional vehicle, the drive torque setting unit 32 is configured to set the required drive torque based on the vehicle speed detected by the vehicle speed sensor and the accelerator operation amount detected by the accelerator operation amount sensor. Specifically, the drive torque setting unit 32 stores a drive torque map for setting the required drive torque using the vehicle speed and the accelerator operation amount as parameters. The drive torque setting unit 32 is configured to acquire the vehicle speed signal of the vehicle speed sensor and the accelerator operation amount signal of the accelerator operation amount sensor, and to set the required driving torque of the vehicle Ve by referring to the driving torque map.

The reference torque setting unit 33 sets the torque of each motor Mfr, Mfl, Mrr, Mrl in the same manner as the conventional vehicles capable of independently controlling the torque of each wheel. Specifically, for example, the distribution ratio of the torque transmitted to the front and rear wheels is determined in accordance with the required drive torque of the vehicle Ve, and the torque of the motor Mfr, Mfl, Mrr, Mrl is determined based on the distribution ratio of the torque. In addition, when the vehicle Ve is traveling in a turning direction, the torque of the motor Mfr, Mfl, Mrr, Mrl is determined by determining the distribution ratio and the torque differential of the torque transmitted to the left and right wheels based on the signals detected by the wheel speed sensor and the steering angle sensor.

The center-of-gravity estimation unit 34 is configured to estimate a position of a center of gravity in at least the vehicle width direction among three axial directions in the vehicle width direction, the vehicle height direction, and the front-rear direction. Specifically, the center-of-gravity estimation unit 34 is configured to acquire a detection value of the pressure sensor 20 provided for each seat 21 and a detection value of the stroke sensor 30 provided for each suspension 25 (that is, a load acting on the suspension 25), and the center-of-gravity estimation unit 34 is configured to calculate and estimate the center-of-gravity position of the vehicle Ve from the mounting positions of the sensors 20 and 30 and the detection value thereof. Alternatively, the center-of-gravity estimation unit 34 is configured to store a center-of-gravity position map that defines a center-of-gravity position corresponding to a position where the occupant is seated, such as a center-of-gravity position when the occupant is seated only on the driver's seat and the rear seat, a center-of-gravity position when the occupant is seated only on the driver's seat, the passenger's seat, and the rear seat of the passenger's seat. The center-of-gravity estimation unit 34 is configured to estimate the position of the center of gravity based on a signal indicating the presence or absence of seating input from a seating sensor (pressure sensor 20) provided for each seat 21. In this case, the center-of-gravity position map may be constructed such that an occupant having a predetermined weight is seated without detecting the weight of the occupant.

Note that the pressure sensor 20 provided on the seat 21 and the stroke sensor 30 provided on the suspension 25 detect a load in the vertical direction, and therefore, if a centrifugal force or an inertial force acts on an object to be detected, there is a possibility that an accurate weight cannot be detected. Therefore, it is preferable that the center-of-gravity estimation unit 34 estimates the position of the center of gravity by acquiring the detected values of the pressure sensor 20 and the stroke sensor 30 when the vehicle Ve is stopped or when the steering angle of the vehicle Ve is straight traveling within a predetermined angular range.

As described above, when the position of the center of gravity of the vehicle Ve estimated by the center-of-gravity estimation unit 34 is deviated in the vehicle width direction from the predetermined position of the center of gravity (predetermined position of the center of gravity) due to the construction of the vehicle Ve, the distance between the estimated center of gravity position and one of the drive wheels is shorter than the distance between the estimated center of gravity position and the other of the drive wheels. The yaw moment acting on the vehicle Ve is a magnitude obtained by multiplying the driving force by the distance between the position where the driving force is generated and the position of the center of gravity. Therefore, when the same torque is outputted from the left and right motor Mfr, Mfl (Mrr, Mrl), there is a possibility that the yaw moment based on the driving force generated by the driving wheels on the side close to the estimated center of gravity position becomes smaller than the yaw moment based on the driving force generated by the driving wheels on the other side, and consequently, there is a possibility that Ve of vehicles is unintentionally deflected.

Therefore, the torque correction unit 35 is configured to correct the reference torque set by the reference torque setting unit 33 based on the position of the center of gravity of the vehicle Ve estimated by the center-of-gravity estimation unit 34. Specifically, the torque correction unit 35 is configured to obtain a difference (distance) between the center of gravity position of the vehicle Ve estimated by the center-of-gravity estimation unit 34 and a predetermined center of gravity position based on the specifications of the vehicle Ve. The torque correction unit 35 obtains a correction torque for canceling a yaw moment caused by a change in the position of the center of gravity from a difference in the position of the center of gravity, and adds the correction torque to the reference torque. Therefore, the torque of the motor (for example, the motor Mfr or the motor Mrr) connected to the wheel on the side where the center of gravity position of the vehicle Ve estimated by the center-of-gravity estimation unit 34 approaches is increased, and the torque of the motor (for example, the motor Mfl or the motor Mrl) connected to the wheel on the other side is decreased.

Figure 7:
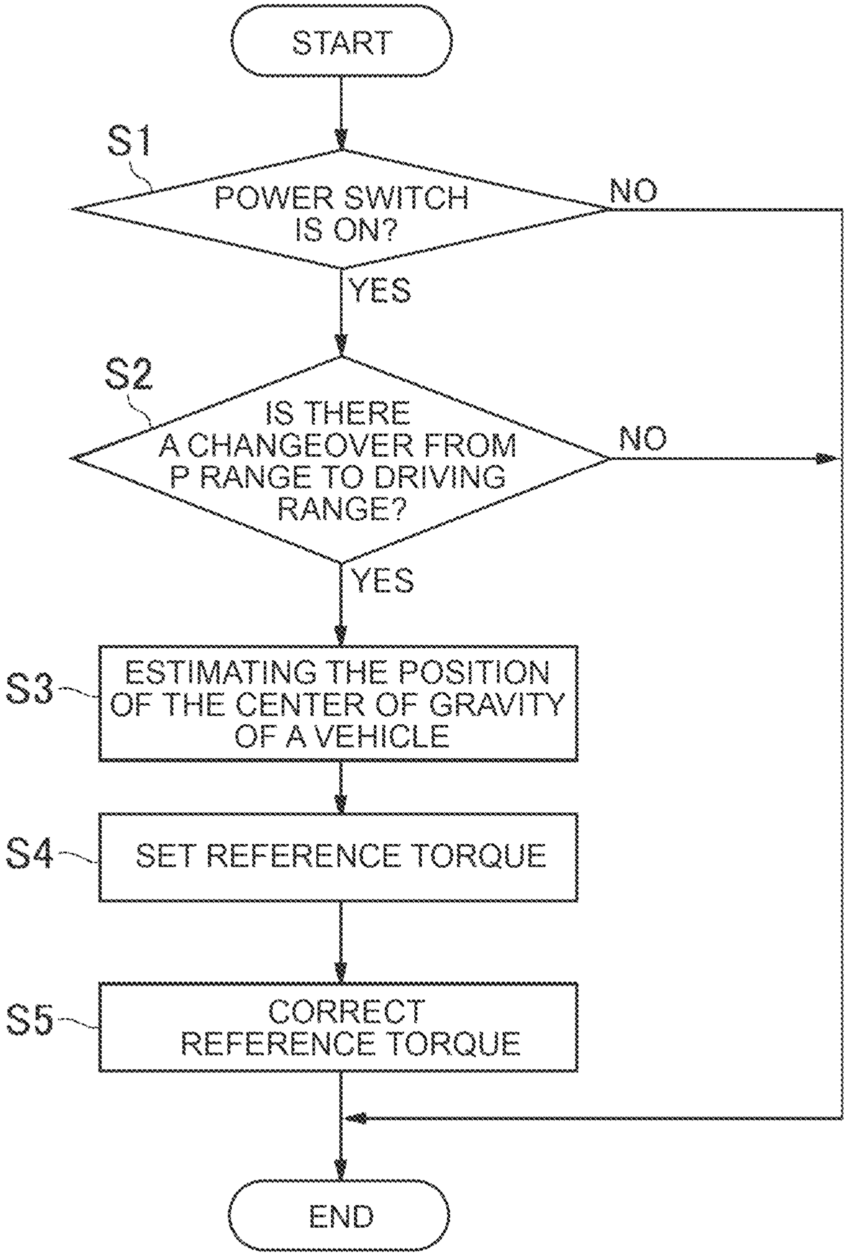
FIG. 7 is a flowchart for explaining an example of control executed in the embodiment of the present disclosure.

FIG. 7 is a flowchart for explaining an example of the control executed by the controller 31. In the control illustrated in FIG. 7, first, it is determined whether or not a power switch for activating the vehicle Ve is on (S1), and if a negative determination is made by S1 due to the power switch being off, the routine is terminated as it is. On the contrary, when the positive determination is made in S1 due to the power switch being on, it is determined whether or not the vehicle has been switched from the parking range (P range) to the driving range (D range or R range) (S2). S2 can be determined based on a switching signal of a shift lever operated by the driver to travel.

When the vehicle is not switched to the driving range, for example, when the vehicle is in the parking range or when the vehicle is switched to the neutral range, there is a low possibility that the vehicle Ve starts traveling immediately, and there is a possibility that the position of the center of gravity of the vehicle Ve changes due to riding or loading. Therefore, if a negative determination is made in S2, the routine is terminated once.

On the contrary, when the driving range is changed from the parking range to the driving range (D range) or the reverse range (R range) and a positive determination is made on S2, the position of the center of gravity of the vehicle Ve is estimated (S3). This S3 is executed by the center-of-gravity estimation unit 34 described above, and is estimated based on the sensing signals of the pressure sensor 20 and the stroke sensor 30.

Then, the reference torque of the motor Mfr, Mfl, Mrr, Mrl is set (S4). This S4 is executed by the reference torque setting unit 33. As described above, the reference torque setting unit 33 obtains the required driving torque according to the vehicle speed and the accelerator operation amount, determines the distribution ratio of the torque of the front and rear wheels according to the required driving torque, and further sets the distribution ratio of the left and right torques of the pair of front wheels and the distribution ratio of the left and right torques of the pair of rear wheels based on the steering angle and each wheel speed.

Then, the reference torque set by S4 is corrected based on the position of the center of gravity estimated by S3 (S5), and the routine is terminated once. This S5 is executed by the torque correction unit 35. That is, the torque correction unit 35 obtains a difference (distance) between the center of gravity position of the vehicle Ve estimated by the center-of-gravity estimation unit 34 and a predetermined center of gravity position based on the specifications of the vehicle Ve. Then, the torque correction unit 35 obtains a correction torque for canceling the yaw moment caused by the change in the position of the center of gravity from the difference in the position of the center of gravity, and adds the correction torque to the reference torque.

As described above, the position of the center of gravity is estimated from the detection values of the pressure sensor 20 provided on the seat 21 and the stroke sensor 30 provided on the suspension 25, and the correction torque for canceling the yaw moment is obtained based on the position of the center of gravity. Accordingly, it is possible to suppress the occurrence of an unintended yaw moment based on the occupant's riding position, the weight thereof, the loading position of the load, and the weight thereof. As a result, it is possible to improve the straight traveling property, the turning traveling property, or the stability at the time of braking. In other words, deterioration in operability during traveling can be suppressed. In particular, the load is not limited to the case where the load is placed on the seat cushion 22, and the load position is not fixed, such as the case where the load is placed under the foot of the rear seat, and the weight thereof is varied. Therefore, by estimating the position of the center of gravity based on the detection value of the stroke sensor 30, an error between the actual position of the center of gravity and the estimated position of the center of gravity can be reduced, and the accuracy of the correction torque can be improved.

Note that the right and left wheel independent drive type vehicle according to the embodiment of the present disclosure is not limited to a vehicle including two motors as driving force sources of a pair of front wheels and two motors as driving force sources of a pair of rear wheels, and may be a vehicle including two motors as driving force sources of either one of the front wheels and the rear wheels, and including an engine and one motor as driving force sources of the other wheel. Even in such a case, by adding the correction torque to the reference torque of the pair of wheels using the two motors as the driving force sources, it is possible to suppress the occurrence of the yaw moment caused by the change in the position of the center of gravity.

What is claimed is:

1. A driving force control device configured to be mounted on a vehicle comprising:
- a right electric motor configured to drive a right wheel of the vehicle;
- a left electric motor configured to drive a left wheel of the vehicle paired with the right wheel; and
- a controller including a processor configured to:
  - determine whether a shift lever of the vehicle has been switched from a parking range to a drive range or a reverse range;
  - estimate a center-of-gravity position of the vehicle while the vehicle is stopped in response to determining that the shift lever has been switched from the parking range to the drive range or the reverse range;
  - obtain a distance between the estimated center-of-gravity position and a predetermined center-of-gravity position determined in advance for the vehicle;
  - calculate a correction torque for canceling a yaw moment caused by a change in the center-of-gravity position based on the distance; and
  - add the correction torque to an output torque of the right electric motor and an output torque of the left electric motor.

2. The driving force control device according to claim 1, further comprising:
- a plurality of seats on which an occupant is to be seated; and
- a plurality of seating sensors provided for each of the seats to detect that the occupant is seated, wherein
- the processor is configured to estimate the center-of-gravity position of the vehicle based on a position of a seating sensor of the plurality of seating sensors that has detected that the occupant is seated.

3. The driving force control device according to claim 2, wherein
- the controller further includes a memory storing a center-of-gravity position map that defines a center-of-gravity position corresponding to a seating position of the occupant, and
- the processor is configured to estimate the center-of-gravity position using the center-of-gravity position map based on a signal indicating presence or absence of the occupant on a seat of the plurality of seats detected by each seating sensor of the plurality of seating sensors.

4. The driving force control device according to claim 3, wherein the center-of-gravity position map includes:
- a first center-of-gravity position corresponding to a situation where occupants are seated only on a driver's seat and a rear seat behind the driver's seat; and
- a second center-of-gravity position corresponding to a situation where occupants are seated only on the driver's seat, a passenger's seat, and a rear seat behind the passenger's seat.

5. The driving force control device according to claim 1, further comprising:
- a plurality of suspensions that reciprocates in an up-down direction of the vehicle to suppress vibration of each of the right wheel and the left wheel in the up-down direction; and a plurality of stroke sensors attached to the plurality of suspensions, respectively, and configured to detect respective displacement amounts of the plurality of suspensions, wherein the processor is configured to estimate the center-of-gravity position of the vehicle based on the respective displacement amounts of the plurality of suspensions detected by the plurality of stroke sensors.

6. The driving force control device according to claim 1, wherein the processor is further configured to increase torque of one of the right electric motor and the left electric motor that is coupled to one of the right wheel and the left wheel on a side closer to the estimated center-of-gravity position than the predetermined center-of-gravity position, and reduce torque of another of the right electric motor and the left electric motor.

7. The driving force control device according to claim 1, wherein the predetermined center-of-gravity position is a design center-of-gravity position of the vehicle.

8. The driving force control device according to claim 1, further comprising:

a plurality of seats on which an occupant is to be seated; and a plurality of pressure sensors disposed in the plurality of seats, respectively, and configured to detect a weight value of an object placed on each seat of the plurality of seats, wherein the processor is configured to estimate the center-of-gravity position of the vehicle based on the detected weight value.

9. The driving force control device according to claim 1, wherein the right wheel is a front right wheel, and the left wheel is a front left wheel.

10. The driving force control device according to claim 1, wherein the right wheel is a rear right wheel, and the left wheel is a rear left wheel.

* * * * *